United States Patent
Chen

(10) Patent No.: US 10,810,381 B2
(45) Date of Patent: Oct. 20, 2020

(54) SPEECH CONVERTER

(71) Applicant: Yong Chen, Sichuan (CN)

(72) Inventor: Yong Chen, Sichuan (CN)

(73) Assignee: SHENZHEN TONGYIKA TECHNOLOGY CO., LTD., Shenzhen (CN)

( * ) Notice: Subject to any disclaimer, the term of this patent is extended or adjusted under 35 U.S.C. 154(b) by 195 days.

(21) Appl. No.: 16/032,058

(22) Filed: Jul. 10, 2018

(65) Prior Publication Data

US 2019/0012313 A1   Jan. 10, 2019

Related U.S. Application Data

(63) Continuation of application No. PCT/CN2017/070802, filed on Jan. 10, 2017.

(30) Foreign Application Priority Data

Jan. 11, 2016 (CN) .......................... 2016 1 0013073

(51) Int. Cl.
| | |
|---|---|
| *G06F 40/58* | (2020.01) |
| *G06F 40/40* | (2020.01) |
| *G06F 40/53* | (2020.01) |
| *G10L 15/08* | (2006.01) |
| *G10L 15/22* | (2006.01) |

(52) U.S. Cl.
CPC .............. *G06F 40/58* (2020.01); *G06F 40/40* (2020.01); *G06F 40/53* (2020.01); *G10L 15/08* (2013.01); *G10L 15/22* (2013.01); *G10L 2015/088* (2013.01)

(58) Field of Classification Search
CPC ....................................................... G06F 40/58
USPC ........................................................ 704/277
See application file for complete search history.

(56) References Cited

U.S. PATENT DOCUMENTS

| | | | | |
|---|---|---|---|---|
| 6,490,563 | B2 * | 12/2002 | Hon ...................... | G06F 40/216 |
| | | | | 704/260 |
| 10,380,241 | B2 * | 8/2019 | Child ...................... | G06F 3/018 |
| 2003/0115059 | A1 * | 6/2003 | Jayaratne ................ | G06F 40/58 |
| | | | | 704/235 |

* cited by examiner

*Primary Examiner* — Susan I McFadden
(74) *Attorney, Agent, or Firm* — Andrew C. Cheng

(57) ABSTRACT

A speech converter for inter-translation between Chinese and the official language of the other party includes a matching card for forming unidirectional matches of a word, a phrase a word group, a short sentence, a common expression and, a sentence expressing the same meaning. The matching cards include a word matching card, a phrase matching card, a word group matching card, a short sentence matching card, a common expression matching card and a sentence matching card. The present invention enables a user to translate what he/she wants to say into a language that a listener can understand immediately, so that the listener can hear and understand these words and answer immediately, and the answer is sent back in mandarin.

20 Claims, No Drawings

SPEECH CONVERTER

CROSS-REFERENCE TO RELATED APPLICATIONS

This application is a confirmation of International Application No. PCT/CN20171070802, filed on Jan. 10, 2017 which claims the benefit of priority from Chinese Application No. 201610013073.3, filed on Jan. 11, 2016. The content of the aforementioned applications, including any intervening amendments thereto, are it herein by reference.

TECHNICAL FIELD

The present invention relates to the field of software and electronic device, in particular to a speech converter and application thereof.

BACKGROUND

Every country has official standard language and dialects. Pronunciations of official language and dialects expressing the same meaning are very different, objectively bringing barriers to accurate translation. Given geographical limitation of dialects, only official language and official words are universally acknowledged. Now that the official language is universally acknowledged cornerstones to express the same meaning, accurate translation should be based on this cornerstone. The reason why such translation has not been popularized in realistic society is that computes, mobile phones, intelligent electrical appliances, software, network and the like are not available.

In realistic society, the official languages of all the countries can be input into computers. Furthermore, a large number of simplified input methods are generated, so that phrases, short sentences and common expressions are convenient to generate and input, leading to an important contribution. For the languages of two countries, if their words, phrases and sentences with the same meanings are mutually matched, and then word groups, short sentences and common expressions with the same meanings are also mutually matched and added, the translation method must be faster and more accurate than an old mode.

Nowadays, many translation tools can directly translate mandarin into languages of other countries but without additional functions. If someone can translate what he/she wants to say into a language that a listener can understand immediately with a tool, the tool will be more convenient for communication and higher in practicability, and has a stronger tangible function of clearing away a language barrier.

SUMMARY

The present invention aims to enable a user to translate what he/she wants to say into a language that a listener can understand immediately with the present invention, so that the listener can hear and understand these words and answer immediately, and the answer is sent back in mandarin.

A speech converter for inter-translation between Chinese and the official language of the other party, including a matching card for forming unidirectional matches of a word, a phrase a word group, a short sentence, a common expression and a sentence expressing the same meaning. The matching card includes a word matching card, a phrase matching card, a word group matching card, a short sentence matching card, a common expression matching card and a sentence matching card. The unidirectionality refers to the translation from Chinese to the official language of the other party or the translation from the official language of the other party to Chinese. The unidirectionality also regulates correspondence of the fixed matching card.

The matching card of the speech converter is further used for generating corresponding words and phrases in the other party's official language expressing the same meaning in the Chinese words and phrases. The matching card is further used for generating corresponding word groups, short sentences, common expressions, and sentences in the other party's official language expressing the same meaning in the Chinese word groups, short sentences, common expressions and sentences. The matching card is the matching card from the source language into the target language.

The matching card of the speech converter is further used for generating Chinese words and phrases expressing the same meaning in the other party's official language. The matching card is further used for generating Chinese word groups, short sentences, common expressions, and sentences expressing the same meaning in the word groups, short sentences, common expressions, and sentences of the other party's official language. The matching card is the translation from the target language into the source language.

Specifically, the speech converter of the present invention includes: forming a match of a word, a phrase and a sentence expressing exactly the same meaning to produce a matching card; adding matches of word groups, short sentences and common expressions to produce similar matching cards. The matching cards includes a word matching card, a phrase matching card a word group matching card, a short sentence matching card, a common expression matching card and a sentence matching card expressing the same meaning in Chinese and official language of the other party. More generalized or narrower matches and match cards may be further generated as required.

Preferably, the matching cards of the speech converter have the characteristic of unidirectionality. The unidirectionality of the matching cards is that one matching card is generated from Chinese to the official language of the other party, and another matching card is generated from the official language of the other party to Chinese. The use mode of the matching cards: the matching card from Chinese to the official language of the other party is used for translating Chinese into the official language of the other party, and the matching card from the official language of the other party to the Chinese is used for translating the official language of the other party into the Chinese.

If the number of matches in a match library is larger, translations are timelier and more accurate, and a user feels more convenient, resulting in changes in the matches from quantitative changes to qualitative changes. New matches are continuously added to adapt to a requirement caused by the development of times for language innovation. The main force for innovation must be the users themselves.

Beneficial effects: although translation of words and phrases is extremely accurate, it is very difficult to communicate with the words and the phrases. When hardware such as computers, mobile phones, intelligent electrical appliances and networks and software come out, the matching cards have become new media for accurate and timely translation by adopting the word matches and the phrase matches and adding a large number of the word group matches, the short sentence matches, the common expression matches and the one-sentence matches, and an optimal new way is provided for word translation.

The speech converter further includes a matching language library. The matching language library is formed by the set of words and phrases of the other party's official language generated by the matching card from the source language to the target language, and the set of word groups, short sentences, common expressions, sentences of the other party's official language generated by the matching card; the matching language library is the matching language library from the source language to the target language. The matching language library from the source language to the target language is used for retrieving and matching while translating the source language into the target language.

The speech converter further includes a matching language library. The matching language library is formed by the set of Chinese words and phrases generated by the matching card from the target language into the source language and the set of Chinese word groups, short sentences, common expressions, sentences generated by the matching card; the matching language library is the matching language library from target language to source language. The matching language library from target language to source language is used for retrieving and matching while translating the target language into the source language.

Specifically, the speech converter includes matching cards, and further includes match libraries. Matches formed by two translated languages form a match library. The match library includes an instruction match library and sequencing is performed in the match library. The match library is formed by putting the matching cards with certain features together. The match library with a single feature also may be a sub-match library in a match library with various features.

Preferably, the match library formed by the matches of two translated languages includes matching cards. The same type of matching cards are put together to form the match library. The matching cards include the word matching card, the phrase matching card, the word group matching card, the short sentence matching card, the common expression matching card and the one-sentence matching card which are generated by corresponding words, phrases, word groups, short sentences, common expressions and sentences used for accurately expressing the same meanings in Chinese and the official language of the other party. Putting of the same type of matching cards together to form the match library is to put all the matching cards from Chinese to the official language of the other party together to form one match library, and then put all the matching cards from the official language of the other party to Chinese together to form another match library, so that the two cooperating match libraries form a translation library from Chinese to languages of other countries.

Beneficial effects: with the word match library, during translation, the matches are convenient and quick to retrieve and apply. With the instruction match library, it is necessary to narrow the range of the match library and normalize instruction languages, so that retrieval and application of electrical devices are facilitated. For the sequencing in the match library, a sequencing mode for the matches in the match library is specified, so as to avoid disorder.

Conversion from voice into Chinese includes: a voice-activated recording method and a manual recording method, and further includes Wubi, Pinyin and handwriting.

Beneficial effects: in order to timely and accurately convert the speech, the method builds a channel/way.

The matching language library of the speech converter achieves translation by direct conversion or analogous conversion. When the matching language library matches and translates the target language into Chinese, building a matching card is the basis of translation. Without the matching card, translation cannot be achieved. If no matching card is retrieved in the matching library during translation, a new matching card needs to be generated to achieve translation. The new matching card is put into the matching library so that when the same sentence appears next time, the matching card is already in the matching library and can be retrieved directly for use.

Specifically, the speech converter includes a conversion method of the speech converter, and is characterized by realizing word-to-word conversion, including a direct word-to-word conversion and a word-to-word conversion by an analogy method. The word-to-word conversion is to translate words of two countries by using the match library.

The speech converter includes the match library and the conversion method of the speech converter, and is characterized in direct word-to-word conversion, including: a method for directly generating words of the other party, a solution to enabling an input sentence to accord with the grammar, a method of literal translation, a method for generating a new match card to determine a minimum translation unit, a sentence pattern selection method during literal translation, and a method for generating a new match card by literal translation. The direct word-to-word conversion is a translation method for directly obtaining a result by using the match cards in the match library.

Preferably, the direct word-to-word conversion by the speech converter is the literal translation method, which is further characterized by marking geographical names and personal names. Marking of the geographical names and the personal names has the advantage of automatic transliteration during literal translation.

The new matching card the speech converter determines the minimum translation unit in the sequence of short sentences, word groups, phrases and words. While generating a new matching, card, if a new sentence contains a short sentence of the new matching card, the short sentences is selected as the minimum translation unit. While generating a new matching card, if the new matching card contains a word group of the word group matching card, the word group is selected as the minimum translation unit. While generating a new matching card, if the new matching card contains a phrase of the phrase matching card, the phrase is selected as the minimum translation unit. While generating a new matching card, if the new matching card contains a word of the word matching card, the word is selected as the minimum translation unit.

If a new matching card matching the new target language is needed to be built while translating the language to be translated into the target language, the matching card matching the new target language is generated in the sequence of short sentences, word groups, phrases and words.

Specifically, the direct conversion of languages by the speech converter is the method for generating a new match card to determine a minimum translation unit, which is further characterized by following the sequence of a short sentence, a word group, a phrase and a word generated according to a rule from large to small and the sequence is a preferable sequence of translation units or single words. During generation of a new sentence match card, if a new sentence contains a short sentence of a short sentence match card, firstly, the short sentence is the minimum unit, so that translation is performed with the short sentence match card. If the new sentence contains a word group of a word group match card, the word group is the minimum unit, so that translation is performed with the word group match card in the match library. If the new sentence contains a phrase of a phrase match card, the phrase is the minimum unit, so that translation is performed with the phrase match card in the match library. Finally, the word is the minimum unit, so that translation is performed with a word match card. All the minimum units are connected together according to the original sequence, thereby generating the new sentence match card.

Preferably, the direct word-to-word conversion by the speech converter is the sentence pattern selection method during literal translation, which is further characterized by selecting a sentence pattern for an input sentence. During generation of the new matching card, the sentence pattern is selected for the input sentence, so as to improve the accuracy of the literal translation.

Beneficial effects: the most accurate and most convenient words of the other party are directly generated through the matching cards. During literal translation, automatic transliteration may be realized. What a typing person means may be fully expressed, and new matches are also convenient to generate. The sentence pattern is defined for the input sentence to improve the accuracy of the literal translation, so that newly generated matches are high in accuracy.

The speech converter includes the match library and the conversion method of the speech converter, and is further characterized by realizing the word-to-word conversion by an analogy method, including: complete retrieval for retrieving the match library, a method for retrieving keywords in the match library, a method for judgment and retrieval according to a subject-verb-object relation in a short sentence, and a method for retrieving matches with same phrases as many as possible in the match library. The analogy method for realizing the word-to-word conversion is to find out analogous matches with the matching cards in the match library through retrieval and comparison methods, so as to realize a translation method of words.

The method of determining retrieving through subject-verb-object relation of the short sentences specifically includes: selecting the sentence matching the subject-verb-object relation of the input sentence and basically matching the meaning of the input sentence in the matching library of the target language, if the input sentence by a user can not be found in the matching library of the target language.

Preferably, the speech converter realizes the word-to-word conversion by the analogy method, which is the method for judgment and retrieval according to a subject-verb-object relation in a short sentence. And the method is further characterized by retrieving matches with the same subjects, verbs and objects. During retrieval of the matches with the same subjects, verbs and objects, if a sentence input by a user has no match in the Chinese word match library, the computer indicates that there are sentences basically matching the input sentence in the library for selection and use by the user. A specific retrieval method is: subject-object-object retrieval.

The matching method for retrieving same words as many as possible in the matching target language library specifically includes: selecting the sentence with the most same words as the input sentence and basic matched meaning with the input sentence in the matching library of the target language, if the sentence input by a user can not be found in the matching library of the target language.

Specifically the speech, converter realizes the word-to-word conversion by the analogy method, which is a method for retrieving matches with same phrases as many as possible in the match library. And the method further characterized by retrieving matches with the most same phrases. During retrieval of the matches with the most same phrases, if a sentence input by a user has no match in the Chinese word match library, the computer indicates that there are sentences basically according with the input sentence in the library for selection and use by the user. The retrieval method is that: the number of same phrases is the largest.

Beneficial effects: identical matches may be used immediately to realize the most accurate and most convenient translation method. When a non-matching phenomenon occurs in a phrase library matching process, synonymic words, phrases and sentences are retrieved from the match library to re-put non-matching results. When a non-matching result occurs in a retrieving process, a retrieval result may be described by an optimal mode.

Beneficial effects: a reader may directly read original texts of other countries.

The speech converter is further characterized in that for the conversion method, computers, mobile phones, electrical appliance devices and networks in the aspect of hardware are added and word recording software, voice reading software and required application software in the aspect of software are also added. The computers, the mobile phones, the electrical appliance devices and the networks in the aspect of hardware are storage devices of the present invention. The word recording software, voice reading software and required application software in the aspect of software are necessary tools for implementing, the present invention, and are installed on the hardware. Through the speech converter, a user inputs what he/she wants to say into the hardware through the software to form Chinese, and then the Chinese are converted into words of the other party through the matching cards. A reader for the words of the other party reads the words in a language of the other party through the above-mentioned hardware, and this operation is performed in the opposite way, thereby realizing interaction of speech conversion, thereby realizing interaction of speech conversion.

While translating the language to be translated into the target language, words, phrases, word groups, short sentences, common expressions and sentences in the language to be translated match respectively words, phrases, word groups, short sentences, common expressions and sentences expressing more than one meaning in the target language. The speech converter further comprises a selecting unit. The selecting unit is used tar selecting respectively words, phrases, word groups, short sentences, common expressions and sentences in the language to be translated to match words, phrases, word groups, short sentences, common expressions and sentences expressing the same meaning in the target language.

Specifically, a use method for a one-to-multiple matching card is characterized by displaying matches of different meanings conversely for selection by a user. The operation of displaying the matches of different meanings conversely for selection by the user is that the matching cards, such as the word matching card, the phrase matching card, the word group matching card, the short sentence matching card, the common expression matching card and the one-sentence matching card, include a one-to-multiple matching card capable of expressing several different meanings in addition to a one-to-one matching card capable of only expressing one meaning. At this time, match contents of different meanings are required to be displayed conversely to remind a typing person to make a determination, so that the typing person may determine such a match content that may accurately express own meanings and confirm the match content, and conversely, words of other countries are required to be normalized and be brought in line with Chinese. When the words of one country and Chinese form the one-to-multiple matching cards, a prompt will be also provided to let people from the country to select and determine the contents.

Beneficial effects: a real product is used for realizing the speech conversion, so that people using different languages may chat with one another timely with their own languages, thereby basically clearing away the language barrier. Persons who are learning foreign languages may carry a foreign language teacher who may speak standard languages. In a continuous use process, users may subconsciously make their language habits more standardized and correct the pronunciations of their own standard languages, so as to make their standard language more standard.

Preferably, artificial intelligence of the speech converter is characterized by automatic adding. The automatic adding means that every time a matching card generated by new matches is used by the user, the artificial intelligence will automatically record and add the matching card into the match library for use next time.

Beneficial effects: an upgraded speech converter product becomes a translation robot which accords with the human interest at most, does not participate in a talk of two parties, and is particularly confidential, so that this product is a necessity for exotic travelers and merchants and is popular in lovers from different countries. This product may be used in a secret conversation between heads of two countries, and is more significant.

The speech converter includes multiple methods for translating the language to be translated into target language. Each method for translating the language to be translated into target language matches a unique color marker. Marking the translation by the matching card without confirmation of language experts means the translation is not 100% accurate. The matching card without marker is the one confirmed by language experts and is called confirmed matching card. The translation by the confirmed matching card is considered as 100% accurate.

Specifically the speech converter is characterized by marking a match generation type with a color, including: a method for marking matches confirmed by official software with specific colors, a method for displaying new matches generated by the artificial intelligence with specific colors and a method for expressing matches literally translated by a user through phrases and words with specific colors. The marking of a match generation type with a color is to display matching cards generated by different modes with different colors.

Preferably, the method for marking matches confirmed by a website with specific colors is further characterized by displaying the confirmed matches with specific colors. In the method of displaying the confirmed matches with the specific colors, there are various matches in software. To visually distinguish the matches, the confirmed matches in the software are displayed with the specific colors, and then are sent to other party so that the other party may know immediately that this sentence is definitely correct.

Preferably, the method for displaying the new matches generated by the artificial intelligence with the specific colors is further characterized by displaying the matches generated by the artificial intelligence with the specific colors. In the method of displaying the matches generated by the artificial intelligence with the specific colors, there are various matches in software. To visually distinguish the matches, the matches generated by the artificial intelligence in the software are displayed with the specific colors, and then are sent to other party, so that the other party may definitely know immediately that this sentence is translated by the artificial intelligence, and may ask anything unclear or inaccurate.

Beneficial effects: the matches displayed with the specific colors may accurately tell other party the accuracy of this sentence. A match confirmed by the official software is the most accurate, and a match translated by the artificial intelligence is basically accurate, and a match translated by piecing together by the user is lowest in credibility of the accurate.

Beneficial effects: the number of the matching cards in the match library may be increased quickly. It is also a way to make money.

The speech converter is further characterized in an application. By use of the methods, the steps and the technical solutions of the present invention, the application includes: application 1: all words in the world may be input into languages of the computer to build a way for mutually direct word translation and speech conversion; application 2: the speech converter becomes universal translation software for all words and speeches in and between all the countries; application 3: the speech converter is manufactured into a native translation machine for translating one language into a language of one country and translating one language into languages of several countries; application 4: the speech converter enables dialect speakers in different places to understand each other; application 5: the speech converter clears the final language barrier to make the online shopping in China become unique online shopping in the world.

Beneficial effects: interconnection and intercommunication of all the languages are realized. When people in the world travel around the world, most of the problems caused by the language barrier may be solved in any places using official language, but the speech converter is useless for people who may not type local words.

DETAILED DESCRIPTION

A detailed description will be made below to the present invention to clearly and completely describe technical solutions in embodiments of the present embodiment. Obviously, the described embodiments are merely part of the embodiments of the present invention and not all the embodiments. Based on the embodiments of the present invention, all other embodiments obtained by those ordinarily skilled in the art without paying creative work shall fall within the protection scope of the present invention.

Specific Embodiment 1

A speech converter includes inter-translation between Chinese and official language of the other party and connection of one word, one phrase and one sentence. The speech converter is Characterized by further including: forming matches of words, phrases and sentences for accurately expressing same meanings, generating matching cards, then adding matches of word groups, short sentences and common expressions, and also generating matching cards.

The present embodiment is further configured that: the matching cards include a word matching card, a phrase matching card, a word group matching card, a short sentence matching card, a common expression matching card and a one-sentence matching card which are generated by corresponding words, phrases, word groups, short sentences, common expressions and sentences accurately expressing the same meanings in Chinese and the official language of the other party. More generalized or narrower matches and matching cards may be further generated as required.

Specific Embodiment 2

The matching cards of the speech converter have the characteristic of unidirectionality.

The present embodiment is further configured that: the unidirectionality of the matching cards is that one matching card is generated from the Chinese to the official language of the other party, and another matching card is generated from the official language of the other party to the Chinese.

Specific Embodiment 3

According to the speech converter, the matching cards of the speech converter have the characteristic of a use mode.

The present embodiment is further configured that: the use mode of the matching cards is that: the matching card from the Chinese to the official language of the other party is used for translating the Chinese into the official language of the other party, and the matching card from the official language of the other party to the Chinese is used for translating the official language of the other party into Chinese.

Specific Embodiment 4

According to the speech converter, the matching card of the speech converter is characterized by including a one-to-one match and one-to-multiple match.

If the number of matches in a match library is larger, translations are timelier and more accurate, and a user feels more convenient, resulting in changes in the matches from quantitative changes to qualitative changes. New matches are continuously added to adapt to a requirement caused by the development of times for language innovation. The main force for innovation must be the users themselves.

The working principle: a content to be translated is directly translated into words of the other party through the word match, the phrase match, the word group match, die short sentence match, the common expression match and the one-sentence match. If there is no match, the content is decomposed into several small units. If there is still no match, the small units are decomposed again till a match is found, and then the words of the other party are displayed.

Specific Embodiment 5

The speech converter includes matching cards, and is characterized by further including match libraries. Matches formed by two types of words during translation form a match library. The match library includes an instruction match library, and sequencing is performed in the match library.

The present embodiment is further configured that: the match library is formed by putting the matching cards with certain features together. The match library with a single feature also may be a sub-match library in a match library with various features.

The working principle: one type of matches is generated from all Chinese to the official language of the other party, and these matches are put together to form one match library. Another type of matches is generated from all official language of the other party to Chinese, and these matches are put together to form one match library. If Chinese is required to be translated into other languages, retrieval is performed in the Chinese word match library. If the official language of the other party is required to be translated into Chinese, retrieval is performed in the match library from the official language of the other party to the Chinese.

Specific Embodiment 6

According to the match library of the speech converter, the match library formed by the matches of two types of words during translation includes matching cards. The same type of matching cards are put together to Rum the match library. The matching cards include the word matching card, the phrase matching card, the word group matching card, the short sentence matching card, the common expression matching card and the one-sentence matching card which are generated by corresponding words, phrases, word groups, short sentences, common expressions and sentences which are used for accurately expressing the same meanings in Chinese and the official language of the other party. Putting the same type of matching cards together to form the match library is to put all the matching cards from the Chinese to the official language of the other party together to form one match library, and then put all the matching cards from the official language of the other party to the Chinese together to form another match library, so that the two cooperating match libraries form a translation library from the Chinese to language of another country.

The working principle: one type of matches is generated from all Chinese to the official language of the other party, and these matches are put together to form one match library. Another type of matches is generated from all official languages of the other party to Chinese, and these matches are put together to form one match library. If Chinese is required to be translated into other languages, retrieval is performed in the Chinese word match library. If the official language of the other party is required to be translated into Chinese, retrieval is performed in the match library from the official language of the other party to the Chinese.

Specific Embodiment 7

The working principle: when a person has a man-machine conversation with an electronic device, an instruction is sent according to the matches in the instruction match library, so that the electronic device may understand most easily and then make the most accurate and quickest response.

Specific Embodiment 8

The speech converter includes a conversion method of the speech converter, and is further characterized by realizing word-to-word conversion, including directly realizing the word-to-word conversion and realizing the word-to-word conversion by an analogy method.

The present embodiment is further configured that: the realizing of the word-to-word conversion is to translate languages of two countries by using the match library.

The working principle: Chinese are correspondingly translated into words of the other party through the matching cards in the match library. If there are no such matching cards, new ones are generated through matches. Words of the other party are also translated into Chinese through the matching cards in the match library. If there are no such matching cards, new ones are generated through matches. Therefore, the word-to-word conversion is realized.

Specific Embodiment 9

The realizing of the word-to-word conversion by the speech converter is further characterized by directly realizing the word-to-word conversion, including: a method for directly generating words of the other party, a solution to enabling an input sentence to accord with the grammar, a literal translation method, a method for generating a new matching card to determine a minimum translation unit, a sentence pattern selection method timing literal translation, and a method for generating a new matching card by using a literal translation method.

The present embodiment is further configured that: the direct realizing of the word-to-word conversion is a translation method for directly obtaining a result by using the matching cards in the match library.

The working principle: words of the other party are directly generated through the matching cards, and the matching cards are generated by a user self by the literal translation method.

Specific Embodiment 10

The direct realizing of the word-to-word conversion by the speech converter is characterized by directly generating words of the other party through the matching cards.

The working principle: official language of the other party is directly obtained through the matches.

Specific Embodiment 11

The direct realizing of the word-to-word conversion by the speech converter is the solution to enabling the input sentence to accord with the grammar, and is further characterized by changing a spoken language into a written language.

Specific Embodiment 12

The direct realizing of the word-to-word conversion by the speech converter is the literal translation method, which is further characterized by marking geographical names and personal names.

The present embodiment is further configured that: marking of the geographical names and the personal names has the advantage of automatic transliteration during literal translation.

The working principle: marking of the geographical names and the personal names has the advantage of automatic transliteration during literal translation.

Specific Embodiment 13

The direct realizing of the word-to-word conversion by the speech converter is the method for generating a new matching card to determine a minimum translation unit, which is further characterized by following a short sentence, word group, phrase and word sequence which is generated according to a rule from large to small.

The present embodiment is further configured that: the short sentence, word group, phrase and word sequence which is generated according to the rule from large to small is a preferable sequence of translation units or single words. During generation of a new sentence matching card, if a new sentence contains a short sentence of a short sentence matching card, firstly, the short sentence is the minimum unit, so that translation is performed with the short sentence matching card. If the new sentence contains a word group of a word group matching card, the word group is the minimum unit, so that translation is performed with the word group matching card in the match library. If the new sentence contains a phrase of a phrase matching card, the phrase is the minimum unit, so that translation is performed with the phrase matching card in the match library. Finally, the word is the minimum unit, so that translation is performed with a word matching card. All the minimum units are connected together according to the original sequence, thereby generating the new sentence matching card.

The working principle: if no match is retrieved in the match library, new matches are required to be created. During creating of new sentence matches, the short sentence, word group, phrase and word sequence which is generated according to the rule from large to small is followed, which is a preferable sequence of translation units or single words. If there is a short sentence match, short sentences, word groups in the match library, then phrases in the match library and finally words are used in sequence.

Specific Embodiment 14

The direct realizing of the word-to-word conversion by the speech converter is the sentence pattern selection method during literal translation, which is further characterized by selecting a sentence pattern for an input sentence.

The present embodiment is further configured that: dining generation of the new matching card, the sentence pattern is selected far the input sentence, so as to improve the accuracy of the literal translation.

Specific Embodiment 15

The present embodiment is further configured that: translation realized by artificial intelligence is intelligent translation, which is a method tor translation.

Specific Embodiment 16

The realizing of the word-to-word conversion by the speech converter is further characterized by realizing the script-to-script converter by an analogy method, including: complete retrieval, for retrieving the match library, a method for retrieving keywords in the match library, a method for judgment and retrieval according to a subject-verb-object relation in a short sentence, and a method for retrieving matches with same phrases as many as possible in the match library.

The present embodiment is further configured that: the analogy method for realizing the word-to-word conversion is to find out analogous matches with the matching cards in the match library through retrieval and comparison methods, so as to realize a translation method of words.

Specific Embodiment 17

The speech converter realizes the word-to-word conversion by the analogy method, which is the complete retrieval in the match library and is further characterized in that retrieved parts of the matches are completely matched matches.

Specific Embodiment 18

The speech converter realizes the word-to-word conversion by the analogy method, Which is the method for judgment and retrieval according to a subject-verb-object relation in a short sentence, and is further characterized by retrieving matches with same subjects, verbs and objects.

The present embodiment is further configured that: during retrieval of the matches with the same subjects, verbs and objects, if a sentence input by a user has no match in the Chinese word match library, the computer indicates that there are sentences basically according with the input sentence in the library for selection and use by the user. A specific retrieval method is: subject-verb-object retrieval.

Specific Embodiment 19

The speech converter realizes the word-to-word conversion by the analogy method, which is a method for retrieving matches with same phrases as many as possible in the match library, and is further characterized by retrieving matches with the most same phrases.

The present embodiment is further configured that: during retrieval of the matches with the most same phrases, if a sentence input by a user has no match in the Chinese word match library, the computer indicates that there are sentences basically according with the input sentence in the library for selection and use by the user. The retrieval method is that: the number of same phrases is the largest.

Specific Embodiment 20

The speech converter is further characterized in that for the conversion method, computers, mobile phones, electrical appliance devices and networks in the aspect of hardware are added, and word recording software, voice reading software and required application software in the aspect of software are also added.

The present embodiment is further configured that: the computers, the mobile phones, the electronic devices and the networks in the aspect of hardware are storage devices of the present invention. The word recording software, voice reading software and required application software in the aspect of software are necessary tools for implementing the present invention, and are installed on the hardware. Through the speech converter, a user inputs what he/she wants to say into the hardware through the software to form Chinese, and then the Chinese are converted into words of the other party through the matching cards. A reader for the words of the other party reads the words in a language of the other party through the above-mentioned hardware, and this operation is performed in the opposite way, thereby realizing interaction of speech conversion.

Specific Embodiment 21

According to the speech converter, computers, mobile phones, electronic device and networks in the aspect of hardware are added, and word recording software, voice reading software and required application software in the aspect of software are also added, so that a use method for a one-to-multiple matching card is characterized by displaying matches of different meanings conversely for selection by a user.

The present embodiment is further configured that: operation of displaying the matches of different meanings conversely for selection by the user is that the matching cards, such as the word matching card, the phrase matching card, the word group matching card, the short sentence matching card, the common expression matching card and the one-sentence matching card, include a one-to-multiple matching card capable of expressing several different meanings in addition to a one-to-one matching card capable of only expressing one meaning. At this time, match contents of different meanings are required to be displayed conversely to remind a typing person to make a determination, so that the typing person may determine such a match content that may accurately express own meanings and confirm the match content, and the other way round, words of other countries are required to be normalized and connected with Chinese. When the words of one country and the Chinese form the one-to-multiple matching cards, a prompt will be also provided to let people from the country to select and determine the contents.

The working principle: a speech to be converted is input as Chinese in the hardware according to an input method. If the input speech has a match, words of the other party is directly generated. If the input speech has no match, a device judges whether the input Chinese meet word, phrase and sentence requirements of the Chinese written language or not. If NO, the device provides options for written languages of meanings that are possibly expressed by the input speech to enable a typing person to select and determine a written language from several possible written languages. If the selected speech that meets the Chinese written language has a match, words of the other party are directly generated. If the selected speech has no match, this sentence is decomposed into several short sentences. If the short sentences still have no match, these short sentences are decomposed into word groups. If the word groups still have no match, the word groups are decomposed into phrases. If the phrases still have no match, the phrases are decomposed into words. If the typing person does not want to do this because of troublesomeness, limited time or difficulty in explanation, matches with similar meanings may be found out with keywords. The device is required to provide several options of matches with multiple words that are the same as words in the speech input by the typing person, particularly matches with multiple same keywords, so that the typing person may select and determine the matches in these options to accurate express his/her meanings. If this way still fails, the typing person may surf the Internet to ask online fiends for help, or ask questions, or even pay someone to translate right away to write new matches for immediate use. If these matches include a one-to-multiple match, the computer will indicate the typing person to let the typing person to select and determine a match, so that the typing person may accurately express his/her own meanings. Finally, the matched words of the other party are read in the language of the other party with a reader for the words of the other party, so as to enable the other party to understand. In return, the other party is required to answer, so that their words are also required to be normalized and connected with Chinese. When their words and Chinese form the one-to-multiple matches, the computer will indicate the other party to let the other party to select and determine the matches, and then matched words are read in mandarin with a Chinese reader. Therefore, an interaction of speech conversion is realized.

Specific Embodiment 22

Artificial intelligence added for the speech converter is characterized in automatic adding.

The present embodiment is fuller configured that: the automatic adding is that every time a matching card generated by new matches is used by the user, the artificial intelligence will automatically record and add it into the match library for use next time.

The artificial intelligence added for the speech converter is characterized in automatic communication.

The working principle: on the basis of the working principle of Specific Embodiment 25, the artificial intelligence is added, so that during operation of the device, the artificial intelligence enables every step to be full of intelligence and smartness, thereby improving the performance and adding functions.

Specific Embodiment 23

The speech converter is characterized by marking a match generation type with a color, including: a method for marking matches confirmed by official software with specific colors, a method for displaying new matches generated by the artificial intelligence with specific colors and a method for expressing matches literally translated by a user through phrases and words with specific colors.

The present embodiment is further configured that: the marking of a match generation type with a color is to display matching cards generated by different modes with different colors.

The working principle: the matching cards generated by different modes are displayed with different colors.

Specific Embodiment 24

The marking of a match generation type with a color by the speech converter is the method for marking matches confirmed by a website with specific colors, and is further characterized by displaying the confirmed matches with specific colors.

The present embodiment is further configured that: in the method of displaying the confirmed matches with the specific colors, there are various matches in software. To visually distinguish the matches, the confirmed matches in the software are displayed with the specific colors, and then are sent to other party, so that the other party may definitely know immediately that this sentence is correct.

The working principle: if an expert checks that a new match is correct through the official software, the match is displayed with a specific color to definitely tell a user and a receiver that this sentence is correct.

Specific Embodiment 25

The marking of a match generation type with a color by the speech converter is the method for displaying the new matches generated by the artificial intelligence with the specific colors, and is further characterized by displaying the matches generated by the artificial intelligence with the specific colors.

The present embodiment is cutter configured that in the method of displaying the matches generated by the artificial intelligence with the specific colors, there are various matches in software. To visually distinguish the matches, the matches generated by the artificial intelligence in the software are displayed with the specific colors, and then are sent to other party, so that the other party may definitely know immediately that this sentence is translated by the artificial intelligence, and may ask anything unclear or inaccurate.

The working principle: a new match is automatically generated by the artificial intelligence, but no one knows whether this near match is particularly correct or not, so that this new match is displayed with the specific color to definitely tell the user and the receiver to note that the accuracy of this sentence is not confirmed by the official software.

Specific Embodiment 26

The marking of a match generation type with a color by the speech converter is a method for expressing matches literally translated by a user through phrases and words with specific colors, and is further characterized by displaying literally translated matches with specific colors.

The working principle: a match literally translated by a user through words, phrases and sentences is sent to the other party after being generated, and a software website displays this match with a specific color to definitely tell a receiver that this sentence is translated by him/herself and expresses what he/she wants to say, but the user does not know if the sentence is correct.

Specific Embodiment 25

The working principle: for all users, anyone who provides a qualified match can use 2 matches for free or sell through the platform.

Specific Embodiment 29

The speech converter is further characterized in its application.

The present embodiment is further configured that: by use of the methods, the steps and the technical solutions of the present invention, the application includes: application 1: all words in the world may be input into languages of the computer to build a way for mutually direct word translation and speech conversion; application 2: the speech converter becomes universal translation software for all words and speeches in and between all the countries; application 3: the speech converter is manufactured into a native translation machine or translating one language into a language of one country and translating one language into languages of several countries; application 4 the speech converter enables dialect speakers in different places to understand each other; application 5: the speech converter clears the final language bather to make the online shopping in China become unique online shopping in the world.

The working principle: in intelligent electrical appliances, by use of the methods, the steps and the technical solutions of the present invention, large software architecture is achieved. The software architecture will become universal word and speech translation software among languages of all countries in the world as long as it is filled with readers of two countries, word matches, phrase matches, word group matches, short sentence matches, common expression matches, one-sentence matches and the like as well as continuously supplemented word matches, phrase matches, word group matches, short sentence matches, common expression matches, one-sentence matches and the like. This software is installed in hardware to form a translation machine.

Those skilled in the art can implement or use the present invention through the above-mentioned description of the embodiments disclosed herein. It is obvious for the persons skilled in the art to make various modifications of these embodiments. General theories defined herein may be implemented in other embodiments without departing from the spirit or scope of the present invention. Therefore, the present invention will not be limited by these embodiments described herein, and will fall within the widest scope consistent with the theory and the novelty characteristic that are disclosed herein.

In conclusion, the present invention, as in a language system of the world, constructs a set of "international sign language" system that does not require special study to achieve the effects that: if the other party cannot understand what you said, there is a tool helping you to say what you said to the other party, thus enabling the other party to see and hear clearly; and if you cannot understand what others said, there is a tool helping him/her to say to you, thus enabling you to see and hear clearly. A "deaf-mute sign language" is that a group of deaf-mutes communicate with one another with hand gestures while saying unintelligible words that they may not hear. An "international sign language" is that a group of people who say different languages type words for communication with one another with hands while saying unintelligible words that they may not understand.

This software has an extremely low requirement for users. Those who understand the language and words of this country can directly use this software, so that the software is easier to popularize. The most important aspect is that the official software provides three types of translation languages and displays these languages with colors: the first one is the one, the correctness of which is confirmed by the expert; the second one is translated by the artificial intelligence; and the third one is literally translated by a user him herself on the basis of the grammar, the correctness of which is clear. Furthermore, the other party also knows these types and translated contents under these types.

What is claimed is:

1. A speech converter for inter-translation between Chinese and an official language of another party, comprising a matching card for forming unidirectional matches of a word, a phrase, a word group, a short sentence, a common expression and a sentence expressing the same meaning, a processor and a memory storing one or more programs, when executed by the processor, cause the speech converter to convert a speech; wherein the another party reads through the speech converter for communication; the matching card comprise a word matching card, a phrase matching card, a word group matching card, a short sentence matching card, a common expression matching card and a sentence matching card; wherein the unidirectional matches are a match from Chinese to another language, or a match from the another language to Chinese.

2. The speech converter according to claim 1, wherein the matching card is further used for generating corresponding words and phrases in the other party's official language expressing the same meaning in the Chinese words; the matching card is further used for generating corresponding word groups, short sentences, common expressions, sentences in the other party's official language expressing the same meaning in the Chinese word groups, short sentences, common expressions, sentences; the matching card is the translation from the source language into the target language.

3. The speech converter according to claim 2, wherein a matching language library is formed by the set of words and phrases of the other parry's official language generated by the matching card from the source language to the target language, and the set of word groups, short sentences, common expressions, sentences of the other party's official language generated by the matching card; the matching language library is the matching language library from the source language to the target language; the matching language library from the source language to the target language is used for retrieving and matching translating the source language into the target language.

4. The speech converter according to claim 3, wherein methods of direct conversion comprise a method for directly generating words of the other party, a solution to enabling an input sentence to accord with the grammar; a method of literal translation, a method for generating a new matching card to determine a minimum translation unit, a method of sentence pattern selection during literal translation a method, and a method for generating a new matching card by literal translation.

5. The speech converter according to claim 4, wherein the method for generating a new matching card to determine a minimum translation unit follows the sequence of short sentences, word groups, phrases and words; while generating a new sentence matching card, if a new sentence contains a short sentence of the new matching card, the short sentences is selected as the minimum translation unit; while generating a new matching card, if the new matching card contains a word group of the word group matching card, the word group is selected as the minimum translation unit; while generating a new matching card, if the new matching card contains a phrase of the phrase matching card, the phrase is selected as the minimum translation unit; while generating a new matching card, if the new matching card contains a word of the word matching card, the word is selected as the minimum translation unit.

6. The speech converter according to claim 5, if a new matching card matching the new target language is needed to be built while translating the language to be translated into the target language; the matching card matching the new target language is generated in the sequence of short sentences, word groups, phrases and words.

7. The speech converter according to claim 3, wherein methods of analogous conversion comprise complete retrieval of the matching language library from the source language to the target language, a method for retrieving keywords in the matching library hour the source language to the target language, a method for judgment and retrieval according to a subject-verb-object relation in a short sentence, and a method for retrieving matches with same phrases as many as possible in the match library.

8. The speech converter according to claim 7, wherein the method for judgment and retrieval according to a subject-verb-object relation in a short sentence specifically comprises: selecting the sentence matching the subject-verb-object relation of the input sentence and basically matching the meaning of the input sentence in the matching library from the source language to the target language, if a sentence input by a user can not be found in the matching library from the source language to the target language; building a matching card based on the new sentence; translating the matching card and put the matching card into the matching library from the source language to the target language.

9. The speech converter according to claim 7, wherein a method for retrieving matches with same phrases as many as possible in the match library specifically comprises: selecting the sentence with the most words same as the input sentence and basic matched meaning with the input sentence in the matching library from the source language to the target language, if the sentence input by a user can not be found in the matching library from the source language to the target language; building a matching card based on the new sentence; translating the matching card and put the matching card into the matching library from the source language to the target language.

10. The speech converter according to claim 1, wherein the matching card is further used for generating Chinese words and phrases expressing the same meaning in the other party's official language; the matching card is further used for generating Chinese word groups, short sentences, common expressions, sentences expressing the same meaning in the word groups, short sentences, common expressions, sentences of the other party's official language; the matching card is the translation from the target language into the source language.

11. The speech converter according to claim 10, wherein a matching language library is formed by the set of Chinese words and phrases generated by the matching card from the target language into the source language and the set of Chinese word groups, short sentences, common expressions, sentences generated by the matching card; the matching language library is the matching language library from target language to source language; the matching language library from target language to source language is used for retrieving and matching while translating the target language into the source language.

12. The speech converter according to claim 1, wherein while translating the language to be translated into the target language, words, phrases, word groups, short sentences, common expressions and sentences in the language to be translated match respectively words, phrases, word groups, short sentences, common expressions and sentences expressing more than one meaning in the target language; the speech converter further comprises a selecting unit; the selecting unit is used for selecting respectively words, phrases, word groups, short sentences, common expressions and sentences in the language to be translated to match words, phrases, word groups, short sentences, common expressions and sentences expressing the same meaning in the target language.

13. The speech converter according to claim 1, wherein translating the language to be translated into the target language needs a matching card generated by a plurality of means; the matching card comprises a new matching card generated by a plurality of means; while each matching card translates the language to be translated into the target language, the resulted translation is marked with a matched and unique color adopted by the new matching card generated by each means.

14. The speech converter according to claim 1, wherein methods of marking types of matching cards with colors comprise a method of marking the matching card confirmed by official software with a specific color, a method for displaying new matches generated by the artificial intelligence with a specific color and a method for expressing matches literally translated by a user through phrases and words with a specific color; the marking of a generation type of a matching card with a color refers to displaying matching cards generated by different ways with different colors.

15. The speech converter according to claim 14, wherein the types of matching cards are marked with colors; for the method of marking the matching card confirmed by a website with a specific color, the confirmed match is displayed with a specific color; for the display of the confirmed match with a specific color, given there are various matches in the software, the confirmed matches in the software are displayed with specific colors so as to visually distinguish; and the displayed matches are sent to the other party so that the other party gets to know immediately and clearly that the sentence is correct; or the types of matching cards are marked with colors; for the method of displaying the new match generated by artificial intelligence with a specific color, the generated match by artificial intelligence is displayed with a specific color; for the display of generated match by artificial intelligence with a specific color, given there are various matches in the software, the generated matches by artificial intelligence of the software are displayed with specific colors so as to visually distinguish; and the displayed matches are sent to the other party so the other party gets to know immediately and clearly that the sentence is translated by artificial intelligence and may ask anything unclear inaccurate; or the types of matching cards are marked with colors; for the method of displaying the match generated by literal translation of words with a specific color, the match generated by literal translation is displayed with a specific color; for the display of the match generated by literal translation with a specific color, given there are various matches in the software, the matches generated by literal translation in the software are displayed with specific colors so as to visually distinguish; and the displayed matches are sent to the other party so the receiver gets to blow immediately and clearly that the sentence is pieced together by the user to express what the user wants to say.

16. An application of the speech converter according to claim 1.

17. A speech converter, comprising a processor and a memory storing one or more programs, when executed by the processor, cause the speech converter to convert a speech; a conversion method is used for the speech converter to realize word-to-word conversion, wherein the method comprises directly realizing the word-to-word conversion and realizing the word-to-word conversion by an analogy method, wherein the realizing of the word-to-word conversion is to translate languages of two countries by using the match library, Chinese are correspondingly translated into words of the other party through the matching cards in the match library.

18. The speech converter according to claim 17, wherein the conversion method includes directly realizing the word-to-word conversion, including: a method for directly generating words of the other party, a solution to enabling an input sentence to accord with the grammar, a literal translation method, a method for generating a new matching card to determine a minimum translation unit, a sentence pattern selection method timing literal translation, and a method for generating a new matching card by using a literal translation method, wherein the direct realizing of the word-to-word conversion is a translation method for directly obtaining a result by using the matching cards in the match library.

19. The speech converter according to claim 17, wherein the conversion method comprises realizing the script-to-script converter by an analogy method, including: complete retrieval, for retrieving the match library, a method for retrieving keywords in the match library, a method for judgment and retrieval according to a subject-verb-object relation in a short sentence, and a method for retrieving matches with same phrases as many as possible in the match library, wherein the analogy method for realizing the word-to-word conversion is to find out analogous matches with the matching cards in the match library through retrieval and comparison methods, so as to realize a translation method of words.

20. The speech converter according to claim 17, wherein the speech converter comprises a matching card for forming unidirectional matches of a word, a phrase a word group, a short sentence, a common expression and a sentence expressing the same meaning, the conversion method comprises: generating a new matching card to determine a minimum translation unit follows the sequence of short sentences, word groups, phrases and words; while generating a new sentence matching card, if a new sentence contains a short sentence of the new matching card, the short sentences is selected as the minimum translation unit; while generating a new matching card, if the new matching card contains a word group of the word group matching card, the word group is selected as the minimum translation unit; while generating a new matching card, if the new matching card contains a phrase of the phrase matching card, the phrase is selected as the minimum translation unit; while generating a new matching card, if the new matching card contains a word of the word matching card, the word is selected as the minimum translation unit.

\* \* \* \* \*